United States Patent [19]

Dabbish et al.

[11] Patent Number: 4,914,697

[45] Date of Patent: Apr. 3, 1990

[54] CRYPTOGRAPHIC METHOD AND APPARATUS WITH ELECTRONICALLY REDEFINABLE ALGORITHM

[75] Inventors: Ezzat A. Dabbish, Buffalo Grove; John P. Byrns, Hoffman Estates; Michael J. McClaughry, Cary; Larry C. Puhl, Sleepy Hollow; Daniel P. Brown, Elmhurst; Eric F. Ziolko, Schaumburg; Michael W. Bright, Arlington Heights, all of Ill.

[73] Assignee: Motorola, Inc., Schaumburg, Ill.

[21] Appl. No.: 150,876

[22] Filed: Feb. 1, 1988

[51] Int. Cl.⁴ .............................................. H04L 9/04
[52] U.S. Cl. ........................................ 380/28; 380/29; 380/49; 380/50
[58] Field of Search ................. 380/9, 28, 49, 50, 20, 380/29

[56] References Cited

U.S. PATENT DOCUMENTS

| | | | |
|---|---|---|---|
| 4,004,089 | 1/1977 | Richard et al. | 380/50 |
| 4,274,085 | 6/1981 | Marino, Jr. | 380/29 |
| 4,306,289 | 12/1981 | Lumley | 380/4 |
| 4,484,025 | 11/1984 | Ostermann et al. | 380/49 |
| 4,525,599 | 6/1985 | Curraw et al. | 380/49 |
| 4,543,646 | 9/1985 | Ambrosius, III et al. | 380/49 |
| 4,598,170 | 7/1986 | Piosenka et al. | 380/49 |
| 4,646,147 | 2/1987 | Kruger | 380/20 |
| 4,747,139 | 5/1988 | Taafe | 380/44 |
| 4,751,733 | 6/1988 | Delayaye et al. | 380/50 |
| 4,817,144 | 3/1989 | Citta et al. | 380/20 |

Primary Examiner—Salvatore Cangialosi
Attorney, Agent, or Firm—Timothy W. Markison; Charles L. Warren; Donald B. Southard

[57] ABSTRACT

A cryptographic apparatus for encrypting and decrypting digital words includes a mechanism that permits a cipher algorithm to be electronically stored after the manufacture of the apparatus. The storing mechanism includes at least one electrically erasable, programmable gate array containing a portion of the cipher algorithm and at least one random access memory device coupled to the array for storing digital data generated by the algorithm. A mechanism which is coupled to the gate array and memory device controls the execution of the algorithm for each digital word thereby decrypting encrypted digital words and encrypting non-encrypted digital words.

19 Claims, 2 Drawing Sheets

CRYPTOGRAPHIC METHOD AND APPARATUS WITH ELECTRONICALLY REDEFINABLE ALGORITHM

BACKGROUND OF THE INVENTION

This invention is generally directed to the field of digital cryptographic devices and is more specifically directed to the architecture and method by which a cipher algorithm is stored in the cryptographic apparatus. This invention also addresses a method for manufacturing encrypted communications equipment in an unsecured environment as a result of the cipher algorithm being loaded into the encryption device after the manufacture of the equipment.

In a typical encryption device, a secret key is utilized in conjunction with a cipher algorithm to encrypt and decrypt messages. The keys may be changed as frequently as desired in order to enhance security.

The cipher algorithm which consists of the steps by which the message is encrypted and decrypted using a particular key is frequently protected in order to maintain high levels of security. If the algorithm is known, it becomes easier to decipher a coded message since only the message and key are then unknowns. Thus it is important that the algorithm itself be protected for maximum security applications.

It is also important that the electronic circuits in which the algorithm resides be designed not to fail in a way which would compromise the message being communicated. Algorithms which are stored in logic hardware are easier to be made to "fail safe" than algorithms stored in software. The manufacture of logic hardware containing the cipher algorithms and equipment containing same is often strictly controlled. The manufacture of communications equipment containing such fixed encryption logic requires substantial additional procedures as compared with communications equipment that does not utilize encryption. This results in the need for strict controls and substantially increases manufacturing costs.

OBJECTS OF THE INVENTION

It is an object of the present invention to provide an encryption apparatus having an architecture which permits the cipher algorithm to be electronically entered subsequent to the manufacture of the apparatus and subsequent to the manufacture of communications equipment utilizing the encryption apparatus.

Another object of this invention is to provide an improved method for the manufacture of encrypted communications equipment in which security control measures need not be utilized during the manufacture of such equipment.

DETAILED DESCRIPTION

Figure 1:
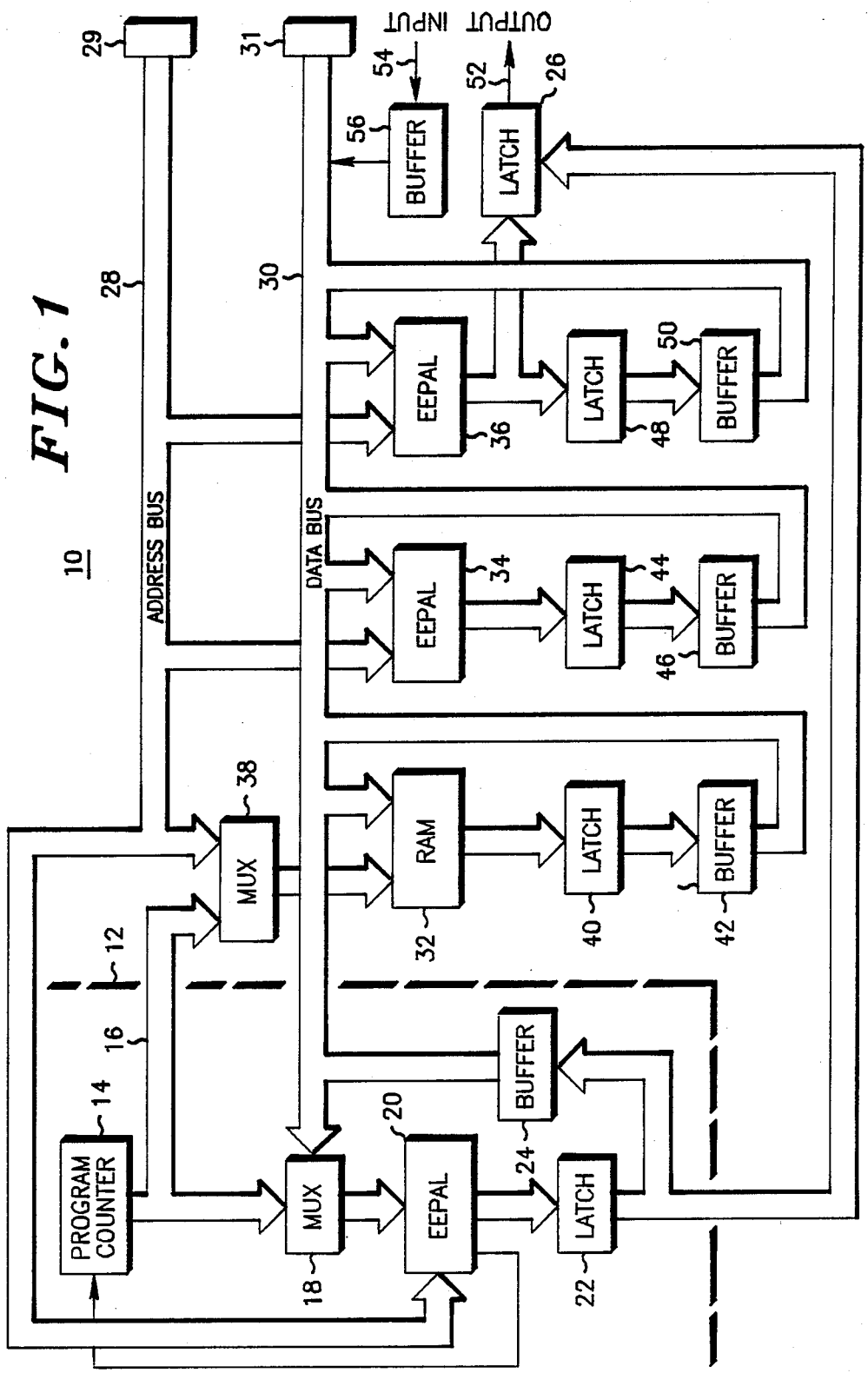
FIG. 1 is a block diagram of an embodiment of an encryption device according to the present invention.

FIG. 1 illustrates an embodiment 10 of a cryptographic apparatus in which the cipher algorithm can be electronically defined after its manufacture in accordance with the present invention. A sequence controller 12 shown to the left of the dashed line includes a program counter 14 having an output coupled by bus 16 to multiplexer 18. The output of multiplexer 18 is coupled to an electronically erasable, programmable array logic device (EEPAL) 20. Such EEPAL devices are commercially available and consist of a number of logic gates which can be electronically programmed to interconnect to each other to produce an output determined by a Boolean algebraic formula operating on the input data. As used herein, array logic devices do not include microprocessors. It is important that the array logic devices be electronically programmable and are preferably erasable to permit reprogramming. The output of device 20 is coupled by latch 22 to buffer 24 and to latch 26. An output of device 20 also provides a clock input to program counter 14 which causes the counter to increment periodically and step through a preprogrammed number of steps.

The general purpose of sequence controller 12 is to control the cyclic operation sequence of the remainder of the circuitry shown in FIG. 1, i.e. implement the cipher algorithm on a step by step basis. A common address bus 28 with communication port 29 and a data bus 30 with communication port 31 establish digital communication paths with EEPAL 20, random access memory (RAM) device 32, and EEPAL's 34 and 36. RAM 32 is addressed by multiplexer 38 which selects between the output 16 of program counter 14 or address bus 28. Data is input to RAM 32 by data bus 30. The data information stored in a particular address is coupled from RAM 32 by latch 40 and buffer 42 to data bus 30.

EEPAL 34 has address and data inputs from the respective buses. The output from EEPAL 34 is coupled by latch 44 and buffer 46 to data bus 30. Similarly, EEPAL 36 receives address and data inputs from the respective bus lines. Its output as determined by its particular gate configuration is coupled to data bus 30 by latch 48 and buffer 50. Its output is also coupled to latch 26 and defines the encrypted digital output 52 at the end of the program sequence which is communicated to latch 26 via the output of latch 22.

The digital information to be encrypted is coupled by input 54 to buffer 56 which in turn couples the information to data bus 30. The digital information consists of digital words having one or more bits. It will be understood that the encryption of the input data by the encryption apparatus 10 must be accomplished prior to the input of the next information to be encrypted in order to maintain a real time message flow. Thus it will be apparent that the clock (not shown) which provides clock information t the elements shown in FIG. 1 must be of a sufficient rate to allow the number of steps required by the cipher algorithm to be completed within the input time frame.

One important aspect of the present invention is the ability to have the cipher algorithm defined after the manufacture of the hardware which will carry out the algorithm. The preferred embodiment shown in FIG. 1 accomplishes this goal by the use of electronically erasable, programmable array logic devices and random access memory. After the manufacture of the encryption device 10 and its insertion into the communications equipment, an external device such as a microprocessor controlled computer is coupled to the address and data bus ports and is utilized to program the internal gate configurations of each EEPAL with a test algorithm and define initial test data stored in RAM 32. After testing is complete the communications equipment can be delivered to the customer with the test program still in the encryption device so that the completed unit can be handled without the use of security measures. The customer would then load the encryption device with the cipher algorithm by use of a similar external computer.

Since the cipher algorithm can not be determined based on the test algorithm, it is not necessary to have strict security control of such equipment prior to the actual cipher algorithm being externally programmed. This permits the encryption hardware as well as equipment containing the hardware to be manufactured without a strict security control environment.

In order to better understand the operation of the encryption apparatus 10, the following illustrative example is provided. An external computer which has been preprogrammed to define the EEPAL's and load initial data into RAM is coupled to the address and data bus. The EEPAL's are each sequentially programmed to perform a specific Boolean algebra function. A key and initialization data are stored in RAM 32. The apparatus is now ready to process incoming data on input 54 since it contains the desired cipher algorithm.

The first input data byte or word is stored in RAM 32. The key and the input data stored in RAM 32 are transferred as input data to EEPAL 34 which acts upon such data to produce a resulting output data R1. The resulting data R1 is stored in RAM 32. The initialization data and the resulting data R1 are transferred from RAM 32 to EEPAL 36 which acts upon these inputs to produce output data F. This output data F is stored in RAM 32 and is substituted in the place of the initialization data so that it will be used in the place of same for the next input data to be encrypted. Simultaneously, the data F is transferred to latch 26 and is clocked out at line 52 as the encrypted output data. A recursive process occurs for each new input data byte to produce a corresponding output encrypted data.

The above example illustrates a possible encryption application. It will be apparent that since RAM 32 is available, intermediate products can be stored and later used for subsequent calculations in a variety of ways depending upon the complexity of the mathematical functions used. Depending upon the level of security desired, the number of iterations required, and the speed at which the encryption processed must occur, more or fewer EEPAL's can be used.

Another advantage of the present invention resides in the use of the RAM 32 instead of an alternative storage device such as a shift register. The RAM can function as a programmable register thereby allowing the number of bytes which can be stored during any process to be varied within the ultimate capacity of the RAM. This adds a degree of security to such an apparatus since it increases the difficulty of determining the number of bytes or length of the calculations being used.

The encryption apparatus of the present invention can also be contrasted with the use of a general purpose microprocessor or a more specialized digital signaling processor to accomplish a similar encryption technique. Although such alternatives could be used, the relatively complicated internal structure of the microprocessor makes such an alternative difficult to design to "fail safe"; that is, fail in an acceptable manner which protects the security of the message without compromising the algorithm being utilized. The more direct functioning apparatus in accordance with the present invention can be more easily protected and diagnosed in the event of a failure.

Figure 2:
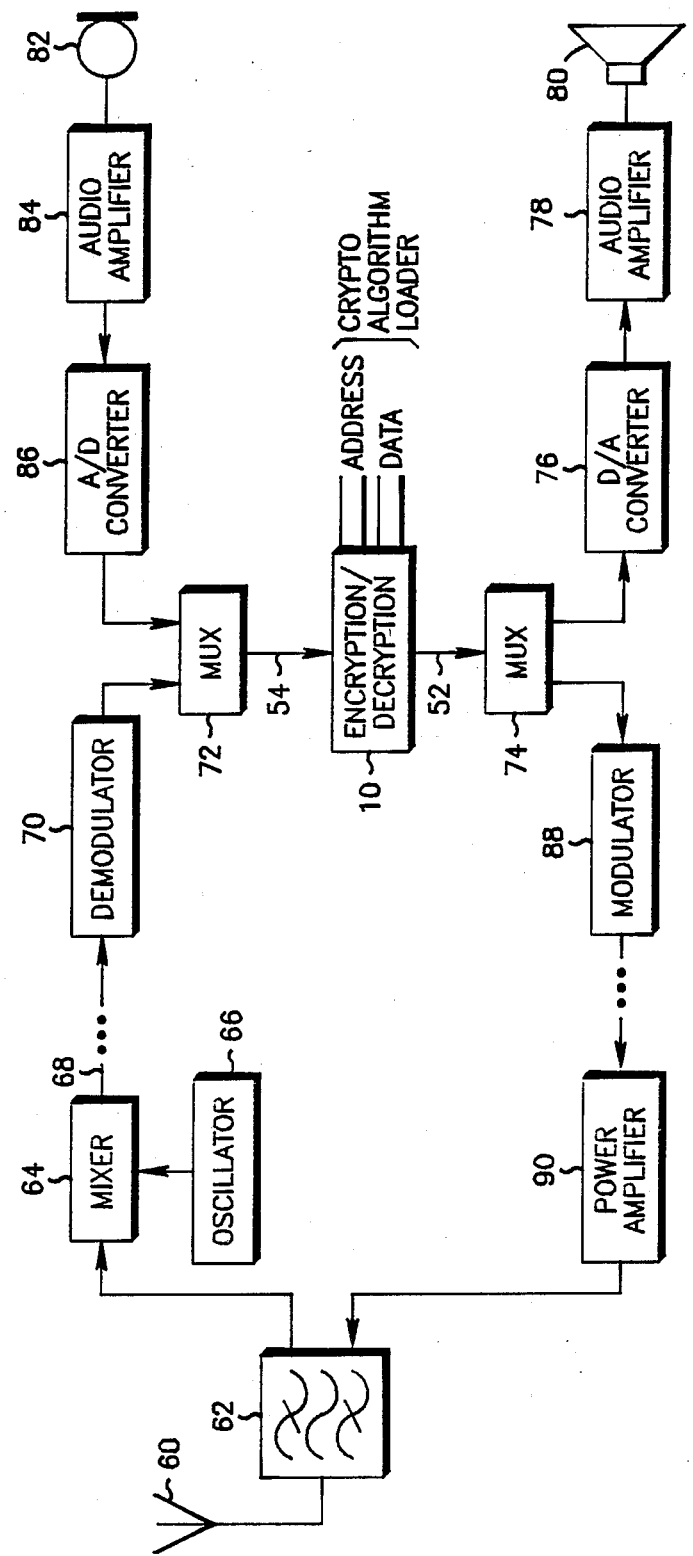
FIG. 2 is a block diagram of communications equipment incorporating the encryption apparatus in accordance with the present invention.

FIG. 2 illustrates communication equipment consisting of a two-way radio which incorporates the encryption apparatus 10 in accordance with the present invention. An antenna 60 couples signals carrying voice information to a duplexer and filter 62 which couples a received signal to mixer 64. The other signal to mixer 64 from oscillator 66 is mixed to produce a resulting intermediate frequency output 68. Conventional receiver circuits between 68 and demodulator 70 are not shown. The demodulator provides an output to multiplexer 72 which routes the received encrypted signal as digital input 54 to the encryption device 10. The decrypted output 52 from the device 10 is coupled by multiplexer 74 to digital to analog converter 76. The analog output from converter 76 is amplified by audio amplifier 78 before being coupled to speaker 80.

The signal received will have been encrypted by a corresponding encryption device 10 in a remote radio utilizing a corresponding cipher algorithm and key. In this example the recovered data is decrypted by device 10 and converted to an analog signal to provide a clear text voice message to the listener.

To transmit an encrypted message, a voice signal is coupled by microphone 82 to audio amplifier 84 whose output is converted into a digital signal by analog to digital converter 86. The output of this converter is coupled by multiplexer 72 to encryption device 10 which encrypts the input data and provides an output 52 coupled by multiplexer 74 to the modulator 88 in a transmitter. The conventional transmitter stages normally found between modulator 88 and power amplifier 90 are not shown. The amplified signal from amplifier 90 is coupled through filter 62 to antenna 60 where it is transmitted to a corresponding receiver having a similar encryption device 10.

As previously explained, the manufacture of such a radio would require security and accounting procedures if the encryption device 10 contained the cipher algorithm during the manufacture of the radio. Since the present invention allows the cipher algorithm to be loaded at a later time, the radio including the encryption device 10 can now be manufactured in a factory environment not subject to strict security measures.

Although a radio transceiver is shown in FIG. 2 as incorporating the encryption device, it will be apparent that other communications equipment designed to carry voice or data, such as modems and secure telephones can equally use the encryption apparatus according to the present invention.

Although an embodiment of the present invention has been described and illustrated herein, the scope of the invention is defined by the claims which follow.

What is claimed is:

1. A two-way communication device comprising:
   means for demodulating received encrypted signals to provide inbound encrypted digital information;
   means for generating modulated signals corresponding to outbound encrypted digital information;
   cryptographic means for decrypting said inbound encrypted digital information and generating said outbound encrypted digital information from non-encrypted digital information, said cryptographic means comprising:
   random access memory means for storing the digital information, recursion intermediate data, and at least one key;

reprogrammable logic means, operably coupled to the random access memory means, for performing a plurality of Boolean functions on the digital information, the recursive intermediate data, and the at least one key to produce output data and the recursion intermediate data;

reprogrammable controller means, operably coupled to the reprogrammable logic means and the random access memory means, for controlling inputting the digital information to the random access memory means, for controlling transferring the digital information, the recursion intermediate data, and the at least one key from the random access memory means to the reprogrammable logic means, for controlling inputting the recursion intermediate data from the programmable logic means to the random access memory means, for controlling the performing of a plurality of the Boolean functions by the reprogrammable logic means, and for controlling outputting the output data from the reprogrammable logic means; and communications means, operably coupled to the reprogrammable logic means, the random access memory means, and the reprogrammable controlling means, for providing input and output digital communication paths such that the digital information is inputted to the cryptographic apparatus and encrypted or decrypted information is outputted from the cryptographic apparatus and for providing communications paths such that the reprogrammable logic means and the reprogrammable controlling means are programmable by an external device.

2. The two-way communication device of claim 1 wherein the reprogrammable logic means comprises at least one electronically programmable array logic device.

3. The two-way communication device of claim 1 wherein the communication means comprises an address bus, a data bus, and communication ports that allow an external programming device to program the reprogrammable logic means and the programmable controlling means and allow the key to be inputted.

4. The two-way communication device of claim 1 wherein the reprogrammable logic means comprises at least one electronically erasable programmable array logic (EEPAL) device.

5. The two-way communication device of claim 4 wherein at least one of the EEPAL devices are programmed by an external programming device via the digital communication paths.

6. The two-way communication device of claim 1 wherein the programmable controlling means comprises at least one electronically programmable array logic device.

7. The two-way communication device of claim 1 wherein the programmable controlling means comprises at least one electronically erasable programmable array logic (EEPAL) device.

8. The two-way communication device of claim 7 wherein at least one of the EEPAL devices are programmed by an external programming device via the digital communication paths.

9. A cryptographic apparatus for encrypting and decrypting digital information comprising:
random access memory means for storing the digital information, recursion intermediate data, and at least one key;

reprogrammable logic means operably coupled to the random access memory means, for performing a plurality of Boolean functions on the digital information, the recursive intermediate data, and the at least one key to produce output data and the recursion intermediate data;

reprogrammable controller means, operably coupled to the reprogrammable logic means and the random access memory means, for controlling inputting the digital information to the random access memory means, for controlling transferring the digital information, the recursion intermediate data, and the at least one key from the random access memory means to the reprogrammable logic means, for controlling inputting the recursion intermediate data from the programmable logic means to the random access memory means, for controlling the performing of a plurality of the Boolean functions by the reprogrammable logic means, and for controlling outputting the output data from the reprogrammable logic means; and communications means, operably coupled to the reprogrammable logic means, the random access memory means, and the reprogrammable controlling means, for providing input and output digital communication paths such that the digital information is inputted to the cryptographic apparatus and encrypted or decrypted information is outputted from the cryptographic apparatus and for providing communications paths such that the reprogrammable logic means and the reprogrammable controlling means are programmable by an external device.

10. The cryptographic apparatus of claim 9 wherein the reprogrammable logic means comprises at least one electronically programmable array logic device.

11. The cryptographic apparatus of claim 20 wherein the reprogrammable logic means comprises at least one electronically erasable programmable array logic (EEPAL) device.

12. The cryptographic apparatus of claim 11 wherein at least one of the EEPAL devices are programmed by an external programming device via the digital communication paths.

13. The cryptographic apparatus of claim 9 wherein the programmable controlling means comprises at least one electronically programmable array logic device.

14. The cryptographic apparatus of claim 9 wherein the programmable controlling means comprises at least one electronically erasable programmable array logic (EEPAL) device.

15. The cryptographic apparatus of claim 14 wherein at least one of the EEPAL devices are programmed by an external programming device via the digital communication paths.

16. A method for manufacturing a communication device which includes a cryptographic apparatus comprising the steps of:
installing said cryptographic apparatus in said communication device, such that at the time of installation, said cryptographic apparatus does not including a cipher algorithm to be used;
loading said cryptographic apparatus with a test algorithm that allows it to be tested;
testing said communication device and cryptographic apparatus for proper operation; and
following said installation and testing, erasing the test algorithm and reprogramming said cryptographic apparatus to perform a Boolean algebraic function that forms at least part of the cipher algorithm to be used, whereby the cipher algorithm to be used cannot be determined based on the test algorithm.

17. The method according to claim 16 wherein said step of erasing comprises electronically erasing the test algorithm.

18. The method according to claim 16 further comprising the step of electronically programming an erasable, programmable array logic device to include said Boolean algebraic function.

19. The method according to claim 16 further comprising the step of loading the cipher algorithm into said cryptographic apparatus over common digital address and data buses contained within the cryptographic apparatus, said Boolean algebraic function being electronically defined in an erasable, programmable array logic device coupled to said buses within said cryptographic apparatus.

* * * * *